United States Patent
Beesley et al.

(10) Patent No.: US 10,361,970 B2
(45) Date of Patent: Jul. 23, 2019

(54) AUTOMATED INSTANTIATION OF WIRELESS VIRTUAL PRIVATE NETWORKS

(71) Applicant: FUJITSU LIMITED, Kawasaki-shi, Kanagawa (JP)

(72) Inventors: William Beesley, Murphy, TX (US); Olufemi Adeyemi, Frisco, TX (US); Melvin Tan, Richardson, TX (US)

(73) Assignee: FUJITSU LIMITED, Kawasaki (JP)

(*) Notice: Subject to any disclaimer, the term of this patent is extended or adjusted under 35 U.S.C. 154(b) by 159 days.

(21) Appl. No.: 15/237,191

(22) Filed: Aug. 15, 2016

(65) Prior Publication Data
US 2018/0048588 A1    Feb. 15, 2018

(51) Int. Cl.
| | |
|---|---|
| *H04L 12/911* | (2013.01) |
| *H04L 29/06* | (2006.01) |
| *H04L 29/08* | (2006.01) |
| *H04L 12/46* | (2006.01) |
| *H04W 12/00* | (2009.01) |

(52) U.S. Cl.
CPC ........ *H04L 47/788* (2013.01); *H04L 12/4633* (2013.01); *H04L 63/0272* (2013.01); *H04L 69/324* (2013.01); *H04W 12/00* (2013.01)

(58) Field of Classification Search
CPC ... H04L 47/788; H04L 12/4641; H04L 67/42; H04L 69/324
See application file for complete search history.

(56) References Cited

U.S. PATENT DOCUMENTS

| | | | |
|---|---|---|---|
| 9,928,082 B1 * | 3/2018 | Huynh Van | G06F 9/4416 |
| 2008/0043760 A1 * | 2/2008 | Venkatraman | H04L 12/4641 370/401 |
| 2012/0096517 A1 * | 4/2012 | White | G06F 21/606 726/3 |
| 2012/0147894 A1 * | 6/2012 | Mulligan | G06F 9/45533 370/395.53 |
| 2013/0054763 A1 * | 2/2013 | Van der Merwe | H04W 8/12 709/220 |
| 2013/0142093 A1 * | 6/2013 | Miklos | H04W 8/06 370/310 |
| 2016/0337104 A1 * | 11/2016 | Kalligudd | H04W 76/10 |

* cited by examiner

*Primary Examiner* — Nicholas R Taylor
*Assistant Examiner* — Sanjoy Roy
(74) *Attorney, Agent, or Firm* — Baker Botts L.L.P.

(57) ABSTRACT

A wireless virtual private network (VPN) connection may be automatically instantiated from a wireless VPN client device using a VPN instantiation server. The VPN client device may automatically connect to the VPN instantiation server to obtain client configuration information for a VPN connection to a VPN endpoint server. The VPN instantiation server may instantiate the VPN endpoint server using a network function virtualization (NFV) platform. Then, the VPN client may establish a layer 2 tunnel across a wireless network to the VPN endpoint server.

14 Claims, 5 Drawing Sheets

AUTOMATED INSTANTIATION OF WIRELESS VIRTUAL PRIVATE NETWORKS

BACKGROUND

Field of the Disclosure

The present disclosure relates to communication networks, and more specifically, to automated instantiation of wireless virtual private networks.

Description of the Related Art

As virtualization of computing resources is increasingly adopted, virtual private networks (VPN) have also become widespread in metropolitan area networks (MAN), such as Metro Ethernet promulgated by the Metro Ethernet Forum (MEF). More recently, with the proliferation of wireless access points in MAN environments, VPNs may rely on various wireless technologies, such as Long-Term Evolution (LTE) and Institute of Electrical and Electronic Engineers (IEEE) 802.11 standards, also commonly known as "WiFi". Typically, installation and configuration of a VPN end device, including wireless VPN end devices, has been a manual procedure performed by a network technician.

SUMMARY

In one aspect, a disclosed first method is for instantiating virtual private services in networks. The first method may include establishing a wireless network connection to a virtual private network (VPN) instantiation server from a VPN client. The first method may include sending a request to the VPN instantiation server for client configuration information, the client configuration information usable to instantiate a VPN connection from the VPN client to a VPN endpoint server. In the first method, the VPN endpoint server may have non-wireless access to a metropolitan area network (MAN). The first method may further include receiving the client configuration information from the VPN instantiation server. Using the client configuration information, the first method may also include establishing a security tunnel with the VPN endpoint server, and establishing a layer 2 tunnel with the VPN endpoint server within the security tunnel. Using the layer 2 tunnel and the wireless network connection, the VPN connection may be established to the MAN via the VPN endpoint server.

In any of the disclosed embodiments of the first method, the MAN may be a metro Ethernet. In any of the disclosed embodiments of the first method, the security tunnel may be an Internet-protocol security tunnel. In any of the disclosed embodiments of the first method, the layer 2 tunnel may utilize a layer 2 tunneling protocol.

In any of the disclosed embodiments of the first method, the VPN endpoint server may have non-wireless access to a wireless network providing the wireless network connection. In any of the disclosed embodiments of the first method, the wireless network may be selected from at least one of a long-term evolution network and an IEEE 802.11 network.

In another aspect a disclosed second method is for instantiating virtual private services in networks. The second method may include receiving, at a virtual private network (VPN) instantiation server from a VPN client, an indication that the VPN client has established a wireless network connection. The second method may further include sending client configuration information to the VPN client to enable the VPN client to instantiate a VPN connection with a VPN endpoint server. The second method may still further include sending server configuration information to a network function virtualization (NFV) platform, the server configuration information usable by the NFV platform to instantiate the VPN endpoint server. In the second method, the VPN endpoint server has non-wireless access to a metropolitan area network (MAN), while the VPN endpoint server is enabled for establishing a security tunnel with the VPN client, establishing a layer 2 tunnel with the VPN client within the security tunnel, and using the layer 2 tunnel and the wireless network connection, establishing the VPN connection to the MAN for the VPN client.

In any of the disclosed embodiments of the second method, the MAN may be a metro Ethernet. In any of the disclosed embodiments of the second method, the security tunnel may be an Internet-protocol security tunnel, while the layer 2 tunnel may utilize a layer 2 tunneling protocol.

In any of the disclosed embodiments of the second method, sending the client configuration information to the VPN client may further include sending the client configuration information via the wireless network connection.

In any of the disclosed embodiments of the second method, the VPN endpoint server may have non-wireless access to a wireless network providing the wireless network connection.

In any of the disclosed embodiments of the second method, the wireless network may be selected from at least one of a long-term evolution network, and an IEEE 802.11 network.

Further disclosed aspects include computer readable memory media storing instructions executable by a processor to instantiate virtual private services in networks, as disclosed herein.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF PARTICULAR EMBODIMENT(S)

Figure 1:
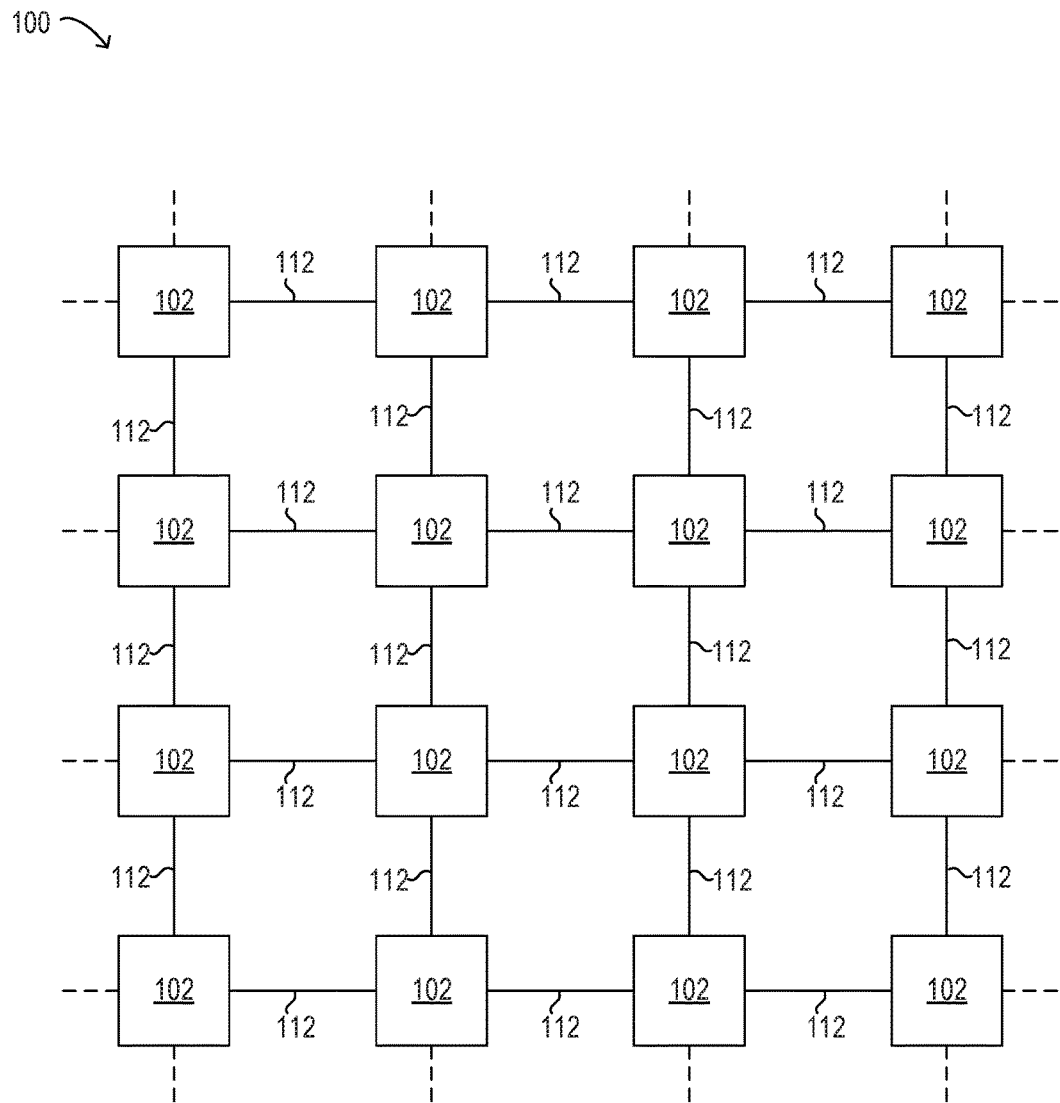
FIG. 1 is a block diagram of selected elements of an embodiment of a network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As noted, various wireless networking technologies, such as LTE and WiFi, continue to expand and proliferate in metropolitan areas serviced by MANs. As a result, the delivery of MAN services over wireless networks has become increasingly desirable. One important aspect in this regard are VPNs, which are increasingly relying on a wireless network connection to provide network access points to the MAN. For example, many MANs are Ethernet networks that comply with Metro Ethernet (MEF) such that various MEF services are also desired from wireless VPN connections.

Typically, in order to configure a VPN end device (referred to herein as a "VPN client") to access a wireless network, relatively costly routing devices that involve manual network provisioning have been used. Additionally, to support such wireless VPN connections, modular blocks of routing resources have been pre-deployed in the central office and have been statically configured to accept a given number of new VPN connections, regardless of whether the VPN connections are used or not. At least for these reasons, conventional manual provisioning and statically configured network operations to support wireless VPN connections have been resource-intensive and have been limited in scalability, which is not economically desirable.

As will be described in further detail, automated instantiation of wireless VPN services is disclosed. The automated instantiation of wireless VPN disclosed herein may enable a VPN client to be automatically provisioned without relying on manual provisioning by a network technician on site. The automated instantiation of wireless VPN disclosed herein may enable the VPN client to contact a VPN instantiation server to obtain client configuration information in order to automatically configure and provision the VPN client. The automated instantiation of wireless VPN disclosed herein may enable the VPN instantiation server to instantiate a VPN endpoint server to provide a VPN connection to the VPN client. The automated instantiation of wireless VPN disclosed herein may enable the VPN instantiation server to centrally administrate business rules and customer specifications, while supporting automated instantiation of VPN clients and VPN endpoint servers. The automated instantiation of wireless VPN disclosed herein may use network function virtualization (NFV) to allocate computing resources by the VPN instantiation server to VPN routing functions based on actual real-time usage, without having to pre-deploy costly network infrastructure that is dimensioned for a predetermined number of VPN connections. The automated instantiation of wireless VPN disclosed herein may enable a VPN provider to send a VPN end device to a customer and enable the customer to use the VPN end device without having to perform any manual provisioning or configuration of a VPN connection, while enabling automatic configuration of the VPN end device via a wireless network.

Turning now to the drawings, FIG. 1 is a block diagram showing selected elements of an embodiment of network 100. In certain embodiments, network 100 may be an Ethernet network. Network 100 may include one or more transmission media 112 operable to transport one or more signals communicated by components of network 100. The components of network 100, coupled together by transmission media 112, may include a plurality of network elements 102. In the illustrated network 100, each network element 102 is coupled to four other nodes. However, any suitable configuration of any suitable number of network elements 102 may create network 10. Although network 100 is shown as a mesh network, network 100 may also be configured as a ring network, a point-to-point network, or any other suitable network or combination of networks. Network 10 may be used in a short-haul metropolitan network, a long-haul inter-city network, or any other suitable network or combination of networks.

Each transmission medium 112 may include any system, device, or apparatus configured to communicatively couple network devices 102 to each other and communicate information between corresponding network devices 102. For example, a transmission medium 112 may include an optical fiber, an Ethernet cable, a T1 cable, a WiFi signal, a Bluetooth signal, or other suitable medium.

Network 100 may communicate information or "traffic" over transmission media 112. As used herein, "traffic" means information transmitted, stored, or sorted in network 100. Such traffic may comprise optical or electrical signals configured to encode audio, video, textual, and any other suitable data. The data may also be transmitted in a synchronous or asynchronous manner, and may transmitted deterministically (also referred to as 'real-time') or stochastically. In particular embodiments, traffic may be communicated via a suitable communications protocol, including, without limitation, the Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic and may provide a network service. In the illustrated embodiment, each network element 102 may be operable to transmit traffic directly to one or more other network elements 102 and receive traffic directly from the one or more other network elements 102.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

In operation, network 100 may be expanded using VPN technology, for example, to provide additional network ports at remote locations where network 100 is not physically deployed. The VPN may rely on either a wired or a wireless connection to a VPN service provider, who enables a VPN client device to access network 100. The VPN access may provide layer 2 support to enable many different types of network services and applications.

As described in further detail below, the VPN access to network 100 may employ a wireless VPN, as described above, that is automatically instantiated using a VPN client and a VPN instantiation server.

Figure 2:
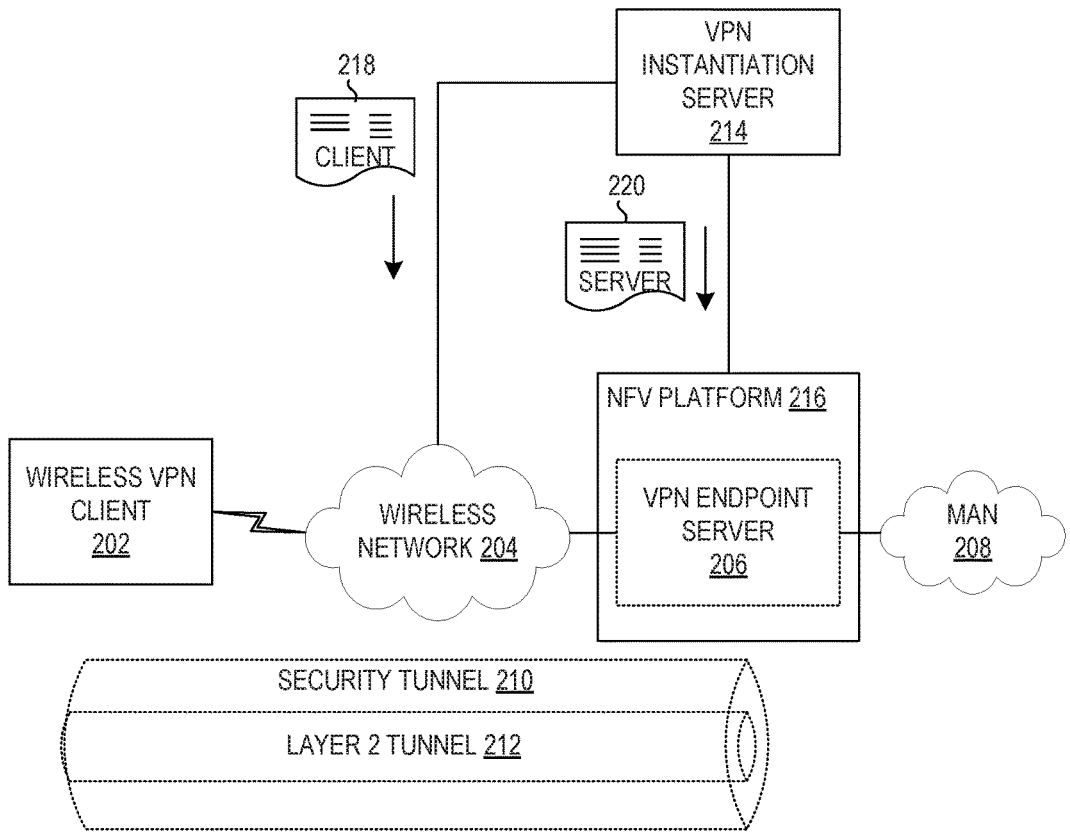
FIG. 2 is a block diagram of selected elements of an embodiment of a wireless metropolitan network architecture.

Referring now to FIG. 2, a block diagram of selected elements of an embodiment of a wireless metropolitan network architecture 200 (or simply "architecture 200") is depicted. Architecture 200 shows how a wireless VPN may be automatically provisioned and configured. As shown, architecture 200 includes wireless VPN client 202 (see also FIG. 3), wireless network 204, VPN instantiation server 214 (see also FIG. 4B), a VPN endpoint server 206 (see also FIG. 4A) instantiated by a network function virtualization (NFV) platform 216, and MAN 208, among other elements. In FIG. 2, VPN endpoint server 206, security tunnel 210, and layer 2 tunnel 212 are shown as logical or virtual elements (in dashed lines) for providing private and secured communications over a VPN connection between wireless VPN client 202 and MAN 208. Wireless VPN client 202 is shown having wireless access to wireless network 204. However, VPN instantiation server 214 and VPN endpoint server 206 may have non-wireless access to wireless network 204, for example, by having access to central office servers supporting wireless network 204. It is noted that wireless network 204 may be a cellular network, such as LTE, or another type of network, such as a WiFi network.

In operation of a wireless VPN, according to architecture 200, a customer (not shown) may seek to add a wireless VPN connection at a first location in order to access MAN 208 serving a second location. The customer may purchase the wireless VPN connection from a network service provider (not shown) that operates architecture 200, including wireless network 204. The service provider may, in turn, purchase the equipment and technology depicted in architecture 200 from an equipment provider, such as Fujitsu Network Communications, Inc., to offer wireless VPN connections to a plurality of customers. The first location of the customer may be accessible to wireless network 204, which may be easier and more economical to use than physically wiring the first location to MAN 208, for various reasons related to infrastructure costs.

Figure 3:
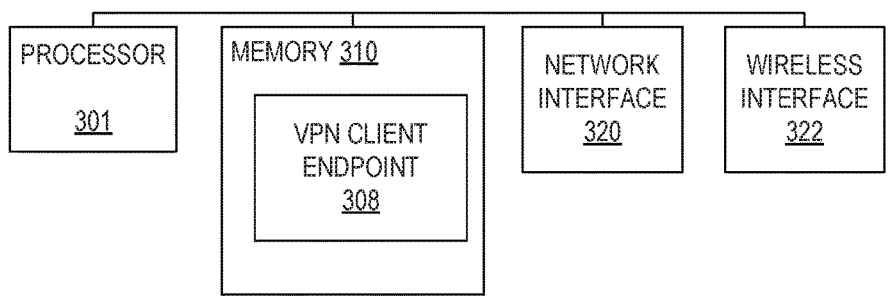
FIG. 3 is a block diagram of selected elements of an embodiment of a wireless VPN client.

Upon purchase of VPN services that include the VPN connection, the service provider may send wireless VPN client 202 to the customer as a physical device (see FIG. 3). In some instances, the service provider may record various business rules and private configuration information at VPN instantiation server 214 under an account for the customer (not shown). The private configuration information may include private network addresses for the second location, such as a network address for MAN 208, for example, when MAN 208 is a private network operated by the customer. Upon receive of wireless VPN client 202 from the service provider, the customer may then simply install wireless VPN client 202 where wireless network 204 provides service at the first location.

Then, upon power up at the first location, wireless VPN client 202 may be configured by the service provider using wireless network 204. For example, the service provider may assign wireless VPN client 202 a wireless network address for wireless network 204 using a configuration protocol, such as the Dynamic Host Configuration Protocol (DHCP). Additionally, the service provider may send wireless VPN client 202 the private network address of VPN instantiation server 214. The wireless network address of wireless VPN client 202 and the private network address of VPN instantiation server 214 may be included in FIG. 2 with client configuration information 218. It is noted that, in some embodiments, certain portions of client configuration information 218 may be pre-programmed in a memory card included with wireless VPN client 202, such as in a single-inline memory module (SIMM) card that registers wireless VPN client 202 with wireless network 204.

Then, using the private network address of VPN instantiation server 214, wireless VPN client 202 may make an initial connection with VPN instantiation server 214 in the form of a request for additional client configuration information 218 usable to instantiate a VPN connection to MAN 208. In response, VPN instantiation server 214 may generate certain client configuration information 218 specific to the instance of wireless VPN client 202 at the first location. The client configuration information 218 may accordingly include an authentication key usable to establish security tunnel 210, a tunnel identifier usable to establish layer 2 tunnel 212, and a session identifier usable to establish a session in layer 2 tunnel 212, among other information. Additionally, client configuration information 218 may include a private network address for VPN endpoint server 206, as well as termination endpoint information for MAN 208 used by VPN endpoint server 206. The termination endpoint information may be a network address or a virtual local area network (VLAN) tag for a VLAN that is created specifically to guide traffic from MAN 208 to wireless VPN client 202. VPN instantiation server 214 may then securely send the additional client configuration information 218 to wireless VPN client 202 via wireless network 204. Wireless VPN client 202 may receive the additional client configuration information 218 from VPN instantiation server 214 and may execute the provisioning changes indicated by client configuration information 218, for example to establish security tunnel 210 and layer 2 tunnel 212 with VPN endpoint server 206.

In the meantime, VPN instantiation server 214 may send server configuration information 220 to NFV platform 216. NFV platform 216 may be a network software system that enables lifecycle management of virtualized resources, including instantiation, configuration, resource allocation, deallocation, and removal. One example of NFV platform 216 is Virtuora® Product Suite by Fujitsu Network Communications, Inc., while it will be understood that other systems may also be used for NFV platform 216. After receiving server configuration information 220 from VPN instantiation server 214, NFV platform 216 may instantiate VPN endpoint server 206 that operates to provide the VPN connection to MAN 208 for wireless VPN client 202. The server configuration information 220 may include specific configuration information for VPN endpoint server 206, which is an individual server instance used to provide the VPN connection to wireless VPN client 202. Accordingly, server configuration information 220 may include the authentication key usable to establish security tunnel 210, the tunnel identifier usable to establish layer 2 tunnel 212, and the session identifier usable to establish a session in layer 2 tunnel 212, among other information. Additionally, server configuration information 220 may include the private network address for VPN endpoint server 206, as well as the termination endpoint information for MAN 208 used by VPN endpoint server 206. The termination endpoint information may be a network address or a virtual local area network (VLAN) tag for a VLAN that is created specifically to guide traffic from MAN 208 to wireless VPN client 202. In this manner, VPN instantiation server 214 may manage a plurality of termination endpoints for a plurality of independent the VPN connections provided to various wireless VPN clients 202.

After receiving client configuration information 218 at wireless VPN client 202 and server configuration information 220 at VPN endpoint server 206, security tunnel 210 may first be instantiated between wireless VPN client 202 and VPN endpoint server 206 using the authentication key provided previously. Security tunnel 210 may represent a network encapsulation protocol to provide an enhanced level of security to individual network packets, such as Internet-protocol security (IPSEC). Once security tunnel 210 is established, layer 2 tunnel 212 may be established within security tunnel 210 using the tunnel identifier provided previously. Layer 2 tunnel may also represent a network encapsulation protocol that operates on individual packets to provide layer 2 services, such as layer 2 tunneling protocol version 3 (L2TPv3, Internet Engineering Task Force, IETF), which enables MEF services, such as multiprotocol layer 2 traffic over IP networks, to be provided. Once layer 2 tunnel 212 is operational, a session in the VPN connection providing layer 2 services, such as MEF services, between wireless VPN client 202 at the first location and MAN 208 at the second location may be established via VPN endpoint server 206 using the session identifier provided previously.

It is noted that the procedure outlined above is performed without any manual interaction with wireless VPN client 202 at the first location. Furthermore, VPN instantiation server 214 may employ NFV platform 216 to dynamically allocate computational resources for the routing functions for each new instance of wireless VPN client 202 that is connected. Administration of various VPN services may be performed at VPN instantiation server 214, which is economically advantageous to the service provider.

When the VPN connection described above is no longer desired, wireless VPN client 202 may be powered off and after some time, VPN instantiation server 214 may instruct NFV platform 216 to remove VPN endpoint server 206 and corresponding network configuration information. In this manner, the computational and network resources allocated for the VPN connection, such as using VPN endpoint server 206, may be dynamically allocated and deallocated, which is economically desirable. For example, VPN endpoint server 206 may be instantiated by NFV platform 216 as a virtual machine (VM) on a server virtualization platform, such as by using a hypervisor to manage the virtual allocation of physical computing resources to a plurality of VMs that may operate and appear as physically instantiated servers or other computing platforms (see also FIG. 4A).

Referring now to FIG. 3, a block diagram of selected elements of an embodiment of wireless VPN client 202 is illustrated. In FIG. 3, wireless VPN client 202 is represented as a physical device including components for implementing wireless metropolitan network architecture 200, as described herein, and may accordingly include processor 301, memory 310, and network interface 320. Processor 301 may represent one or more individual processing units and may execute program instructions, interpret data, process data stored by memory 310 or wireless VPN client 202. It is noted that wireless VPN client 202 may be implemented in different embodiments, such as a small embedded electronic device.

In FIG. 3, memory 310 may be communicatively coupled to processor 301 and may comprise a system, device, or apparatus suitable to retain program instructions and data for a period of time (e.g., computer-readable media). Memory 310 may include various types of components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, or any suitable selection or array of volatile or non-volatile memory. Non-volatile memory refers to a memory that retains data after power is turned off. It is noted that memory 310 may include different numbers of physical storage devices, in various embodiments. As shown in FIG. 3, memory 310 may include VPN client endpoint 308, which may represent instructions to execute client-side aspects of architecture 200, as described above with respect to FIG. 2 (see also FIG. 5).

Figure 4A:
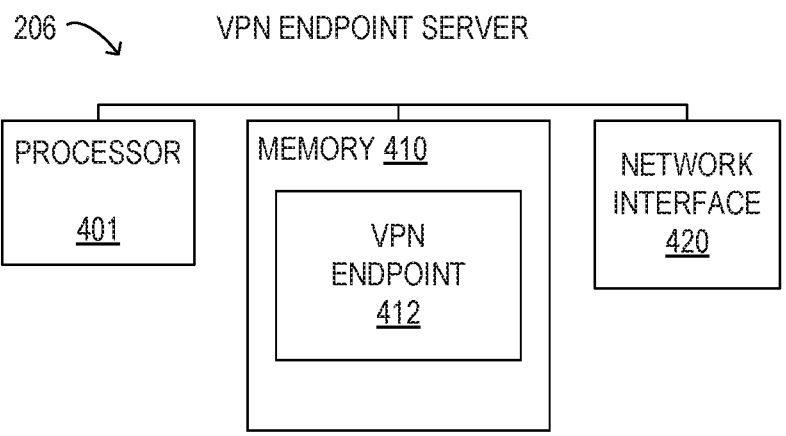
FIG. 4A is a block diagram of selected elements of an embodiment of a VPN endpoint server.

Referring now to FIG. 4A, a block diagram of selected elements of an embodiment of VPN endpoint server 206 is illustrated. In FIG. 4A, VPN endpoint server 206 is represented as a physical device including components for implementing wireless metropolitan network architecture 200, as described herein. As noted above, in some embodiments, VPN endpoint server 206 may be instantiated as a virtualized server, such as a VM under a hypervisor and may be used in architecture 200 as a logical entity. In various embodiments, VPN endpoint server 206 may accordingly include, or have certain access to, processor 401, memory 410, and network interface 420. Network interface 420 may represent one or more physical network ports or other network interfaces available to VPN endpoint server 206. For example, VPN endpoint server 206 may use one network port in network interface 420 for access to the VPN connection via wireless network 204, and may use another network port in network interface 420 for access to MAN 208. Processor 401 may represent one or more individual processing units and may execute program instructions, interpret data, process data stored by memory 410 or VPN endpoint server 206. It is noted that VPN endpoint server 206 may be implemented in different embodiments, such as in a rack domain or a data center.

In FIG. 4A, memory 410 may be communicatively coupled to processor 401 and may comprise a system, device, or apparatus suitable to retain program instructions and data for a period of time (e.g., computer-readable media). Memory 410 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, or any suitable selection or array of volatile or non-volatile memory. Non-volatile memory refers to a memory that retains data after power is turned off. It is noted that memory 410 may include different numbers of physical storage devices, in various embodiments. As shown in FIG. 4A, memory 410 may include a VPN endpoint 412, which may represent instructions to execute a server-side endpoint to the VPN connection with wireless VPN client 202 in architecture 200, as described above with respect to FIG. 2 (see also FIG. 6). VPN endpoint 412 may further perform additional server-side VPN functions, such as routing and packet forwarding via network interface 420, among other examples.

Figure 4B:
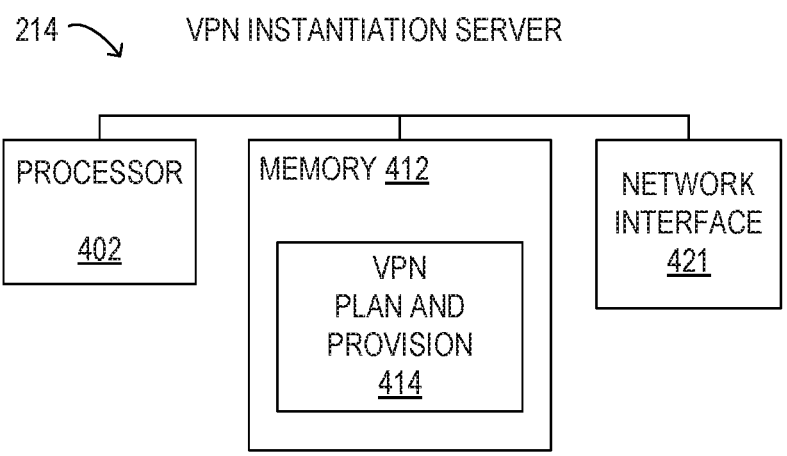
FIG. 4B is a block diagram of selected elements of an embodiment of a VPN instantiation server.

Referring now to FIG. 4B, a block diagram of selected elements of an embodiment of VPN instantiation server 214 is illustrated. In FIG. 4B, VPN instantiation server 214 is represented as a physical device including components for implementing wireless metropolitan network architecture 200, as described herein. In some embodiments, VPN instantiation server 214 may be instantiated as a virtualized server, such as a VM under a hypervisor and may be used in architecture 200 as a logical entity. In various embodiments, VPN instantiation server 214 may accordingly include, or have certain access to, processor 402, memory 411, and network interface 421. Processor 402 may represent one or more individual processing units and may execute program instructions, interpret data, process data stored by memory 412 or VPN instantiation server 214. It is noted that VPN instantiation server 214 may be implemented in different embodiments, such as in a rack domain or a data center.

In FIG. 4B, memory 411 may be communicatively coupled to processor 402 and may comprise a system, device, or apparatus suitable to retain program instructions and data for a period of time (e.g., computer-readable media). Memory 411 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, or any suitable selection or array of volatile or non-volatile memory. Non-volatile memory refers to a memory that retains data after power is turned off. It is noted that memory 411 may include different numbers of physical storage devices, in various embodiments. As shown in FIG. 4B, memory 411 may include a VPN plan and provision 414, which may represent instructions to execute various VPN instantiation and management functions in architecture 200, as described above with respect to FIG. 2 (see also FIG. 6).

Figure 5:
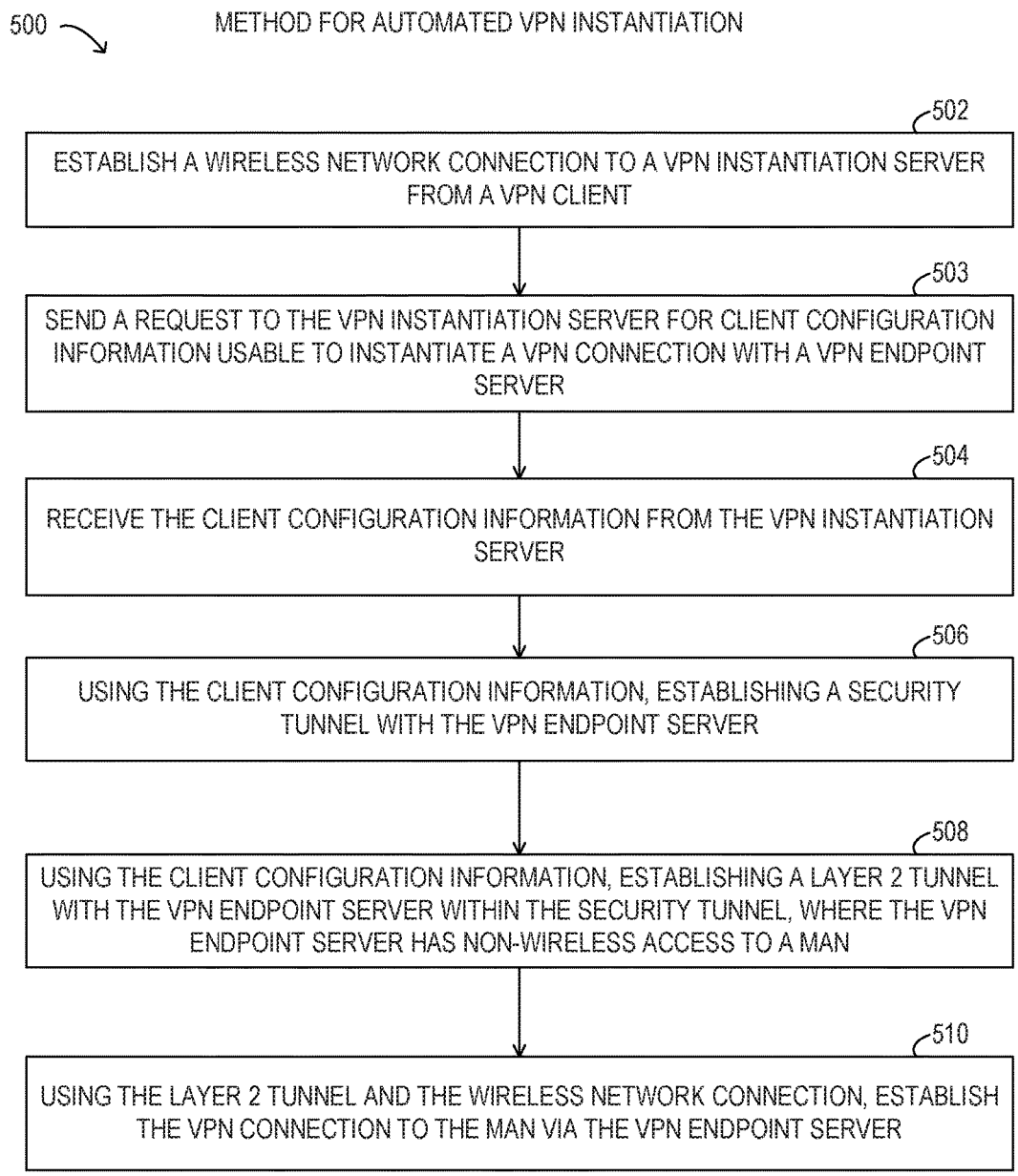
FIG. 5 is a flow chart of selected elements of an embodiment of a method for automated VPN instantiation.

Referring now to FIG. 5, a block diagram of selected elements of an embodiment of method 500 for automated VPN instantiation, as described herein, is depicted in flowchart form. At least certain operations in method 500 may be performed by wireless VPN client 202, such as by VPN client endpoint 308 (see FIGS. 2 and 3). It is noted that certain operations described in method 500 may be optional or may be rearranged in different embodiments.

Method 500 may begin at step 502 by establishing a wireless network connection to a VPN instantiation server from a VPN client. At step 503, a request is sent to the VPN instantiation server for client configuration information usable to instantiate a VPN connection with a VPN endpoint server. At step 504, the client configuration information is received from the VPN instantiation server. Using the client configuration information, at step 506, a security tunnel is established with the VPN endpoint server. Using the client configuration information, at step 508, a layer 2 tunnel is established with the VPN endpoint server within the security tunnel, where the VPN endpoint server has non-wireless access to the MAN. Using the layer 2 tunnel and the wireless network connection, at step 510, the VPN connection is established to the MAN via the VPN endpoint server.

Figure 6:
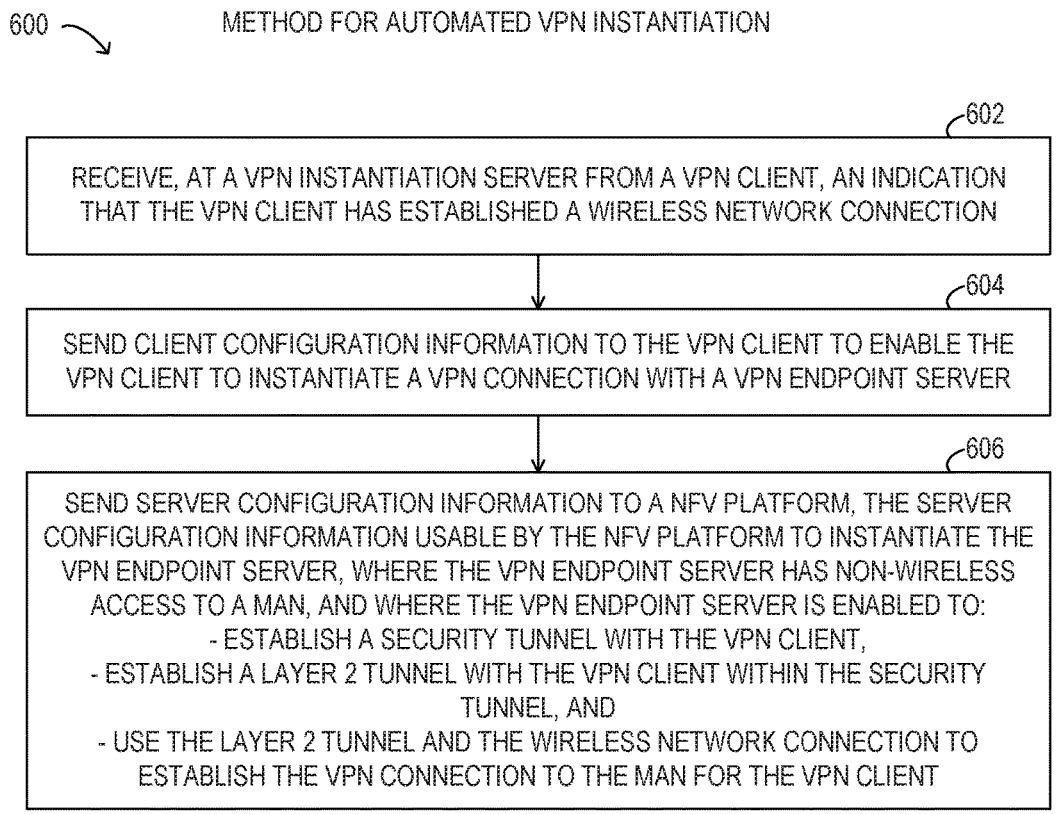
FIG. 6 is a flow chart of selected elements of an embodiment of a method for automated VPN instantiation.

Referring now to FIG. 6, a block diagram of selected elements of an embodiment of method 600 for automated VPN instantiation, as described herein, is depicted in flowchart form. At least certain operations in method 600 may be performed by VPN instantiation server 214, such as by VPN plan and provision 414 (see FIGS. 2 and 4B), while some operations may also be performed by VPN endpoint server 206 (see FIG. 4A). Although method 600 is described with respect to a singular wireless VPN client, it will be understood that method 600 may be used to support a large number of wireless VPN clients simultaneously, for example by instantiating a plurality of instances of VPN endpoint server 206 for a respective plurality of instances of wireless VPN client 202. It is noted that certain operations described in method 600 may be optional or may be rearranged in different embodiments.

Method 600 may begin at step 602 by receiving, at a VPN instantiation server from a VPN client, an indication that the VPN client has established a wireless network connection. At step 604, client configuration information is sent to the VPN client to enable the VPN client to instantiate a VPN connection with a VPN endpoint server. At step 606, server configuration information is sent to a NFV platform, the server configuration information usable by the NFV platform to instantiate the VPN endpoint server, where the VPN endpoint server has non-wireless access to a MAN. As a result of step 606, the VPN endpoint server is enabled to establish a security tunnel with the VPN client, establish a layer 2 tunnel with the VPN client within the security tunnel, and use the layer 2 tunnel and the wireless network connection to establish the VPN connection to the MAN for the VPN client.

As disclosed herein, a wireless virtual private network (VPN) connection may be automatically instantiated from a wireless VPN client device using a VPN instantiation server. The VPN client device may automatically connect to the VPN instantiation server to obtain client configuration information for a VPN connection to a VPN endpoint server. The VPN instantiation server may instantiate the VPN endpoint server using a network function virtualization (NFV) platform. Then, the VPN client may establish a layer 2 tunnel across a wireless network to the VPN endpoint server.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for instantiating virtual private networks, the method comprising:

receiving, at a virtual private network (VPN) instantiation server from a VPN client, an indication that the VPN client has established a wireless network connection;

sending client configuration information to the VPN client to enable the VPN client to instantiate a VPN connection with a VPN endpoint server, the client information including an authentication key to establish a security tunnel between the VPN client and a metropolitan area network (MAN), a tunnel identifier to establish a layer 2 tunnel, a session identifier to establish a session in the layer 2 tunnel, and termination endpoint information for the MAN;

sending server configuration information including the authentication key, the tunnel identifier, the session identifier, and the termination endpoint information for the MAN to a network function virtualization (NFV) platform, the server configuration information usable by the NFV platform to instantiate the VPN endpoint server, wherein the VPN endpoint server has non-wireless access to the MAN, and wherein the VPN endpoint server is enabled for:

establishing the security tunnel with the VPN client, establishing the layer 2 tunnel with the VPN client within the security tunnel, and using the layer 2 tunnel and the wireless network connection, establishing the VPN connection to the MAN for the VPN client; and managing a plurality of termination endpoints for a plurality of independent VPN connections provided to a plurality of VPN clients by allocating computational resources in the VPN endpoint server for routing functions for each new instance of a connected VPN client.

2. The method of claim 1, wherein the MAN is a metro Ethernet.

3. The method of claim 2, wherein the security tunnel is an Internet-protocol security tunnel, and wherein the layer 2 tunnel utilizes a layer 2 tunneling protocol.

4. The method of claim 1, wherein sending the client configuration information to the VPN client further comprises:

sending the client configuration information via the wireless network connection.

5. The method of claim 1, wherein the VPN endpoint server has non-wireless access to a wireless network providing the wireless network connection.

6. The method of claim 1, wherein the wireless network is selected from at least one of: a long-term evolution network; and an IEEE 802.11 network.

7. A non-transitory computer readable memory media storing instructions executable by a processor to instantiate virtual private networks, the instructions comprising instructions to:

receive, at a virtual private network (VPN) instantiation server from a VPN client, an indication that the VPN client has established a wireless network connection;

send client configuration information to the VPN client to enable the VPN client to instantiate a VPN connection with a VPN endpoint server, the client information including an authentication key to establish a security tunnel between the VPN client and a metropolitan area network (MAN), a tunnel identifier to establish a layer 2 tunnel, a session identifier to establish a session in the layer 2 tunnel, and termination endpoint information for the MAN;

send server configuration information including the authentication key, the tunnel identifier, the session identifier, and the termination endpoint information for the MAN to a network function virtualization (NFV) platform, the server configuration information usable by the NFV platform to instantiate the VPN endpoint server, wherein the VPN endpoint server has non-wireless access to the MAN, and wherein the VPN endpoint server is enabled for:

establishing the security tunnel with the VPN client, establishing the layer 2 tunnel with the VPN client within the security tunnel, and using the layer 2 tunnel and the wireless network connection, establishing the VPN connection to the MAN for the VPN client; and manage a plurality of termination endpoints for a plurality of independent VPN connections provided to a plurality of VPN clients by allocating computational resources in the VPN endpoint server for routing functions for each new instance of a connected VPN client.

8. The memory media of claim 7, wherein the security tunnel is an Internet-protocol security tunnel, and wherein the layer 2 tunnel utilizes a layer 2 tunneling protocol.

9. The memory media of claim 7, wherein the instructions to send the client configuration information to the VPN client further comprise instructions to:

send the client configuration information via the wireless network connection.

10. The memory media of claim 7, wherein the VPN endpoint server has non-wireless access to a wireless network providing the wireless network connection.

11. The method of claim 1, wherein the termination endpoint information for the MAN is a network address or a virtual local area network (VLAN) tag for a VLAN utilized to guide traffic from the MAN to the VPN client.

12. The memory media of claim 7, wherein the termination endpoint information for the MAN is a network address or a virtual local area network (VLAN) tag for a VLAN utilized to guide traffic from the MAN to the VPN client.

13. The memory media of claim 7, wherein the MAN is a metro Ethernet.

14. The memory media of claim 7, wherein the wireless network is selected from at least one of: a long-term evolution network; and an IEEE 802.11 network.

\* \* \* \* \*